United States Patent [19]
Wagner

[11] 3,761,194
[45] Sept. 25, 1973

[54] APPARATUS FOR PREVENTING DEFLECTION OF TOOL HEAD GUIDING BEAM

[75] Inventor: Hans Oskar Wagner, Buttgen-Vorst, Germany

[73] Assignee: Schiess Aktiengesellschaft, Dusseldorf-Oberkassel, Germany

[22] Filed: May 2, 1972

[21] Appl. No.: 249,554

[30] Foreign Application Priority Data
May 5, 1971 Germany.................. P 21 22 204.8

[52] U.S. Cl............. 408/234, 90/DIG. 28, 308/6 R
[51] Int. Cl............................................. B23b 47/26
[58] Field of Search ................... 90/DIG. 28, 11 F, 90/11 R, 15; 408/234, 235; 308/6 R, 3 A

[56] References Cited
UNITED STATES PATENTS
2,899,869  8/1959  Daugherty .................... 90/DIG. 28
2,608,449  8/1952  De Haas ........................... 308/3 A Primary Examiner—Gil Weidenfeld
Attorney—Walter Becker

[57] ABSTRACT

A machine tool having a transverse guide beam supported at two longitudinally spaced points in the frame and having guide surfaces on which a tool head is guided in the frame. A support beam is supported on the transverse beam near the points of support of the transverse beam and has a support surface parallel to the aforementioned guide surfaces. A tool head guided on said guide surface has rollers engaging the support surface on the support beam and which are automatically adjustable on the tool head to remain in load transmitting engagement with said support surface when the support beam deflects due to the tool head load, thereby to relieve the transverse beam of loads due to the tool head.

5 Claims, 11 Drawing Figures

APPARATUS FOR PREVENTING DEFLECTION OF TOOL HEAD GUIDING BEAM

The present invention relates to a weight compensating device for the tool carrying head adapted to be guided along a transverse beam of a machine tool, especially vertical boring mill or vertical lathe, which transverse beam is rigidly supported at two points, said tool carrying head being suspended on a supporting beam so as to be movable thereon by at least one roller, while said supporting beam in its turn is supported by the transverse beam within the range of the supporting points of said transverse beam.

The transverse beam, which is supported in such a manner within the region of its tow ends, be supported on a single stand or on the two stands when a two-stand machine tool is involved. With regard to the present invention, it makes no difference in what manner the support is effected and how the displacement of the transverse beam with regard to its height is effected. The term "transverse beam" also includes a transverse beam in the form of a cantilever which over a large portion of its length is so wide or compact that the transverse beam can over this portion of its length be considered rigid so that a bending of the transverse beam over said range of its length by the tool carrying head will not be possible.

By "weight compensating device" is meant a device which relieves the guiding path of the transverse beam from the weight of the tool carrying head by corresponding devices for instance, counter weights, pressure springs, hydraulic cylinders, etc., so that these guiding paths serve exclusively for guiding the tool carrying head in a weightless or nearly weightless manner.

If pressure springs were provided, the weight of the tool carrying head would in both supporting areas of the supporting beam on the transverse beam, which have to be located at the same level with the supporting points of the transverse beam, be absorbed by a correspondingly designed spring force whereby the guiding paths of the transverse beam would be relieved.

When the tool carrying head supported by the supporting beam is moved toward the transverse beam or when a cantilever type transverse beam is employed, is moved to the free end of said cantilever, or when the tool carrying head moves away from the supporting point, the weight of the tool carrying head outside the supporting point acts upon the supporting beam and bends the latter and this all the more the further the tool carrying head moves away from the supporting point. In this instance, the springs are relaxed in conformity with the bending of the supporting beam and thus the guiding paths of the transverse beam are loaded by the spring force reduced by said relaxation.

Inasmuch as this bending of the supporting beam may be considerable depending on the length of the transverse beam, the load acting upon the guiding paths becomes correspondingly high and inherent thereto a bending of the transverse beam will occur which affects the precision of the machine while simultaneously causing a premature wear of the guiding elements.

German Pat. No. 1,213,702 describes a weight compensating device which likewise employs a supporting beam which, however, does not directly absorb the load exerted by the tool carrying head but rather forms a central support for the transverse beam and already prior to the occurrence of a bending counteracts and compensates for the bending of the transverse beam under the load of the tool carrying head. To this end, the supporting beam is lifted by the extent of the otherwise to be expected bending of the transverse beam so that no bending of the transverse beam will occur.

There has also been described in German Pat. No. 1,232,437 an arrangement according to which the transverse beam is completely relieved from the load of the tool carrying head. With this device, above the transverse beam there is provided a supporting beam on which the tool carrying head rests by means of rollers and is displaceable thereon while the bending of the transverse beam is compensated for by the interposition of a piston transmission, the relief is effected automatically hydraulically in conformity with the respective bending of the supporting beam.

The employment of a hydraulic system in this connection represents a considerable expense, especially when considering that the bending to be compensated for as a rule amounts to only fractions of a millimeter while the control of the hydraulics requires a continuous measuring operation concerning the bending of the supporting beam.

It is, therefore, an object of the present invention to provide a weight compensating device which requires neither a measuring system nor a hydraulic control device and which will be able by simple means to compensate for the bending of the supporting beam and will prevent a load from acting upon the guiding paths of the transverse beam.

These and other objects and advantages of the invention will appear more clearly from the following specification in connection with the accompanying drawings, in which.

Figure 8:
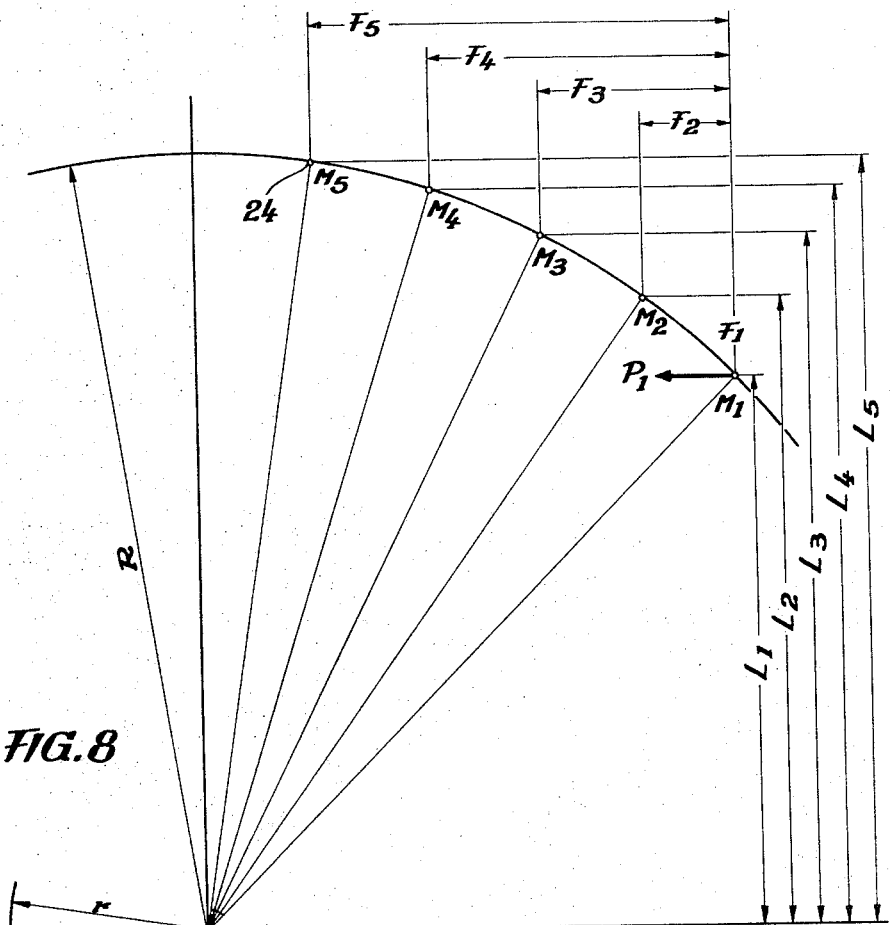

FIG. 8 diagrammatically illustrates the individual positions of the pull rods, supporting shafts and roller center with different bendings of the support beam.

Figure 9:
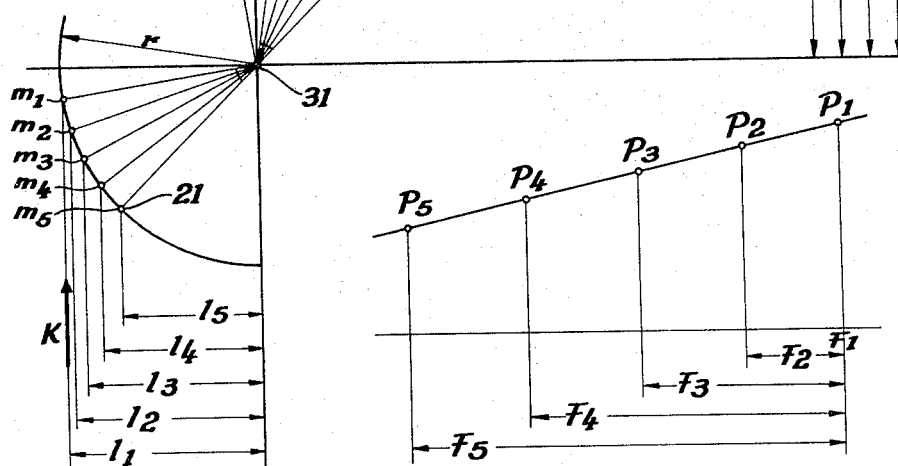

FIG. 9 shows the spring characteristic of the spring which eccentrically engages the supporting shaft.

Figure 10:
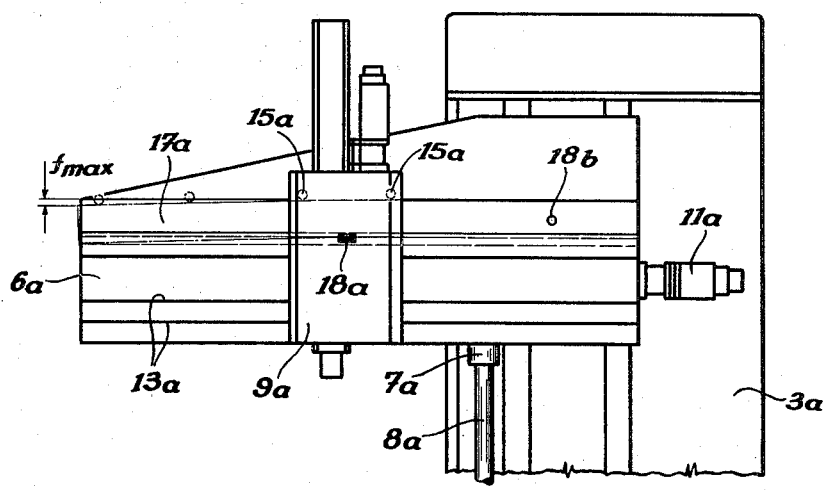

FIG. 10 is a side view of a machine tool with the transverse beam unilaterally guided on the machine stand while the other end of the transverse beam protrudes freely in the manner of a cantilever, and shows the supporting beam supported by the transverse beam and also shows the tool carrying head resting on the transverse beam and displaceably guided thereon.

Figure 11:
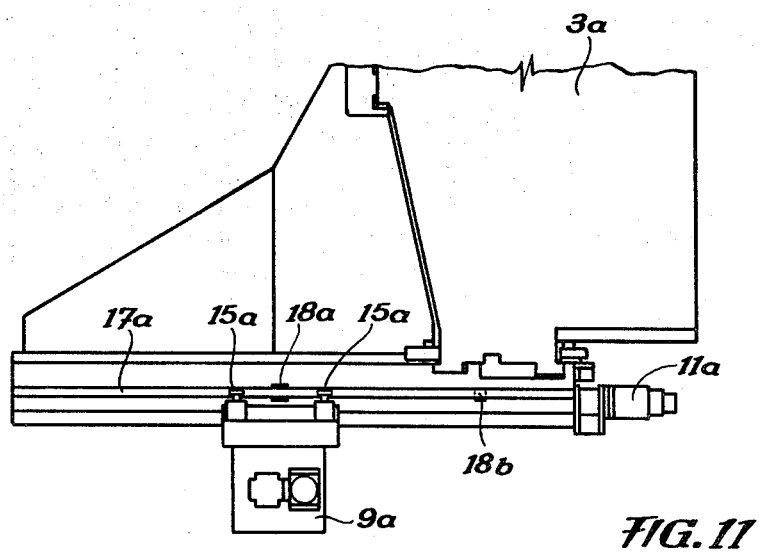

FIG. 11 is a top view of the arrangement shown in FIG. 10.

The weight compensating device according to the present invention is characterized primarily in that each roller is supported by a supporting shaft rotatably journalled on the tool carrying head but arranged eccentrically with regard to the center of rotation of the supporting shaft. The device according to the invention is furthermore characterized in that one end of the spring engages the supporting shaft likewise eccentrically with regard to the center of rotation of the supporting shaft, while the other end of said spring is supported by an abutment provided on the tool carrying head. The eccentricities between the axis of the rollers and the center of rotation of the supporting shaft on one hand or between the center of rotation of the supporting shaft and the point of attack of the spring on the supporting shaft on the other hend and the spring characteristic of the spring are so tuned or selected with regard to each other that when the supporting beam bends in view of the weight of the tool carrying head, the supporting shaft is turned under the influence of the spring in such a way that the entire weight of the tool carrying head will be transferred from the roller or rollers to the supporting beam, and the guiding path of the transverse beam will be relieved from the weight of the tool carrying head.

In view of the design of the eccentricities or lever systems while considering the associated spring forces, i. e., in conformity with the spring characteristic, relieving forces are obtained which bring about a relief of the transverse beamguiding paths so that the same serve only for guiding the tool carrying head. Starting from the fact that in the starting position, i.e., at its supporting point on the transverse beam at which the supporting beam does not bend, the center of rotation of the supporting shaft and the axis of rotation of the roller are located at a certain level with regard to each other, the distance in height between the axis of rotation of the roller and the center of rotation of the supporting shaft changes in response to the displacement of the tool carrying head each time to the extent of the bending of the supporting beam due to the fact that the supporting shafts with the eccentrically journalled rollers which rest on the supporting beam through the intervention of the spring force carry out pivoting movements about the center of rotation of the supporting shaft. This brings about that the height difference between the axis of rotation of the roller and the center of rotation of the supporting shaft on one hand and between the center of rotation of the supporting shaft and the point of attack on the spring on the supporting shaft on the other hand changes during the continuous displacement of the tool carrying head while the supporting beam bends. As a result thereof, in each position of the tool carrying head, the guiding paths of the transverse beam are relieved by means of the eccentricities or means of this lever system including the associated spring force. Accordingly, the guiding means of the transverse beam remain, over the length of the displacement stroke of the tool carrying head, relieved from the load of the tool carrying head in the same manner as in the starting position of said tool carrying head in which the latter is located directly within the region of the supports of the transverse beam and of the supporting beam.

According to a further development of the invention, it is provided that a pull rod eccentrically engages each supporting shaft while the spring in the form of a pressure spring engages around said pull rod. One end of said spring rests upon the free end of the pull rod, whereas the other end of the spring rests on a part fixedly connected to the tool carrying head. The characteristic of the pressure spring is so selected that it corresponds to the load associated with the roller while taking into consideration the lever arm of the forces acting upon the supporting shaft. Instead of pressure springs, it is, of course, also possible to employ hydraulic compressed air cylinder piston systems or the like.

Figure 1:
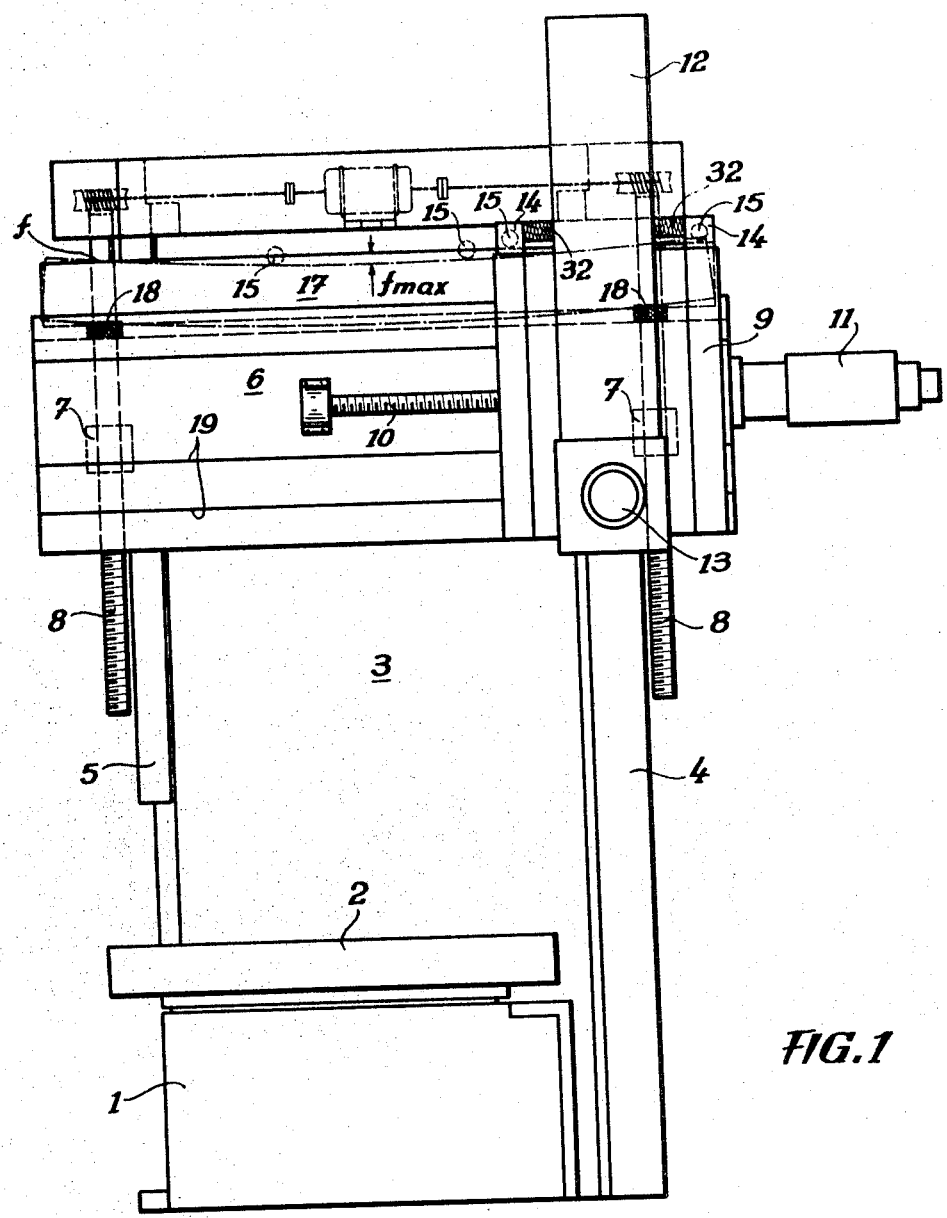
FIG. 1 is a view of a vertical boring mill or vertical lathe with a transverse beam having its two ends supported by a stand while above the transverse beam there is provided a supporting beam with a tool carrying head supported by and displaceable on said supporting beam while the tool carrying head is guided on the transverse beam.
Figure 2:
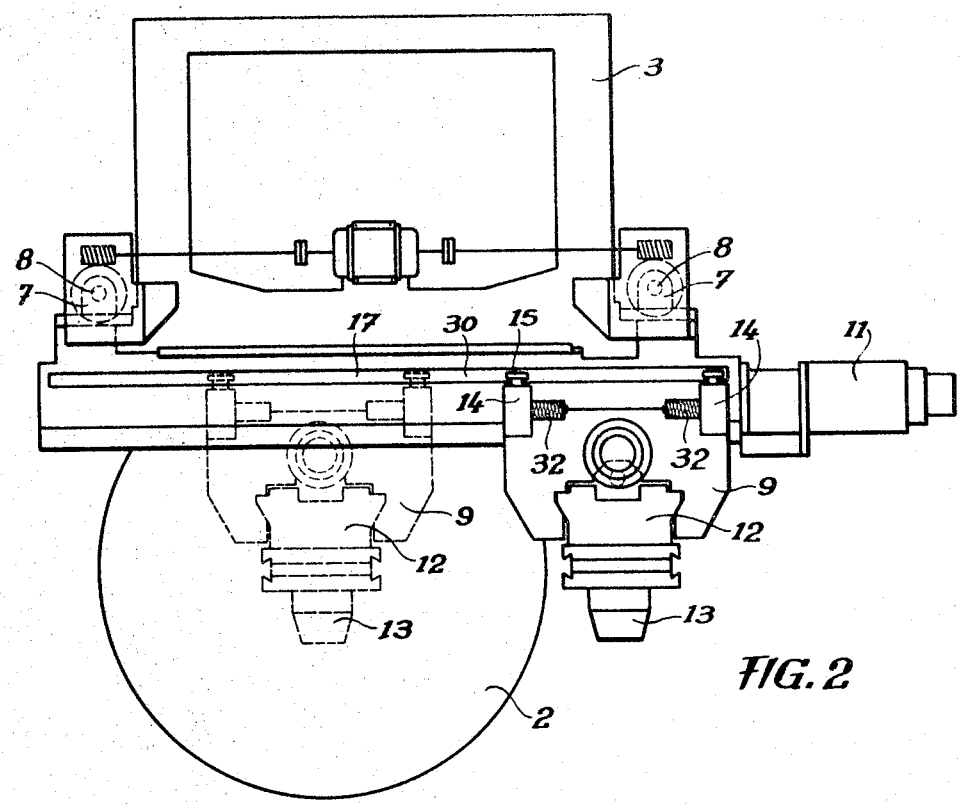
FIG. 2 is a top view of the machine according to FIG. 1.
Figure 3:
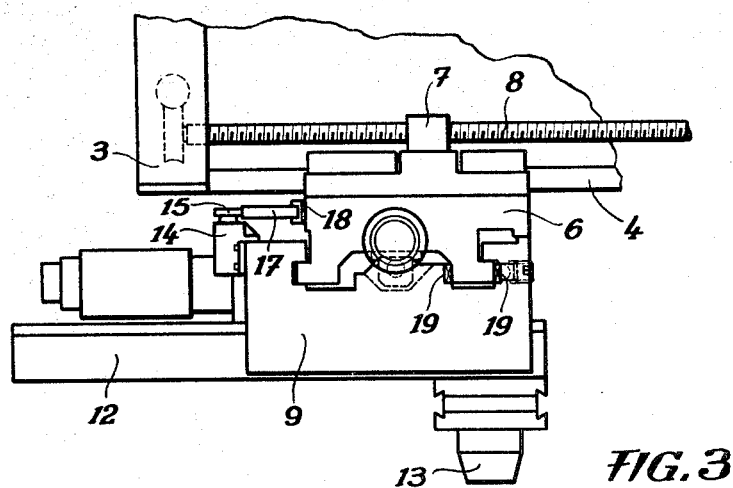
FIG. 3 shows a side view of the machine according to the invention within the region of the transverse beam.
Figure 4:
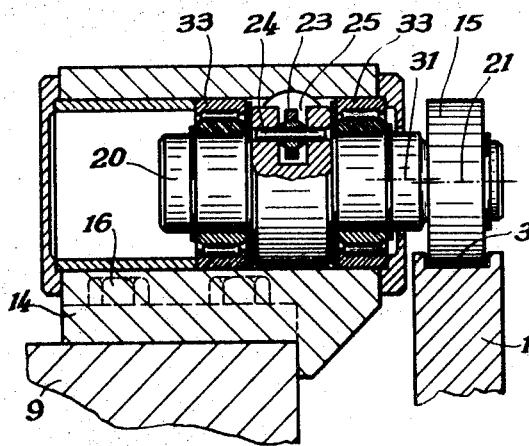
FIG. 4 is a portion of a section within the region of a roll in a position within the area on the supporting beam support.
Figure 5:
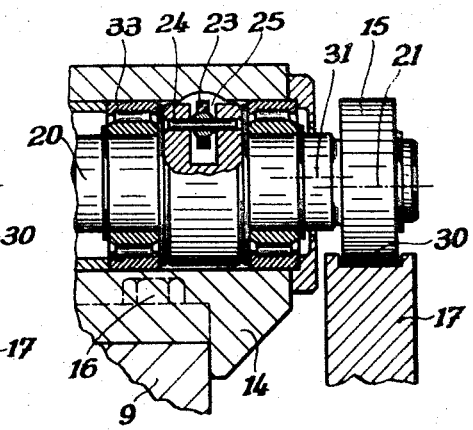
FIG. 5 shows a section corresponding to that of FIG. 4 in which the tool carrying head occupies a position on the transverse beam outside its starting position.
Figure 6:
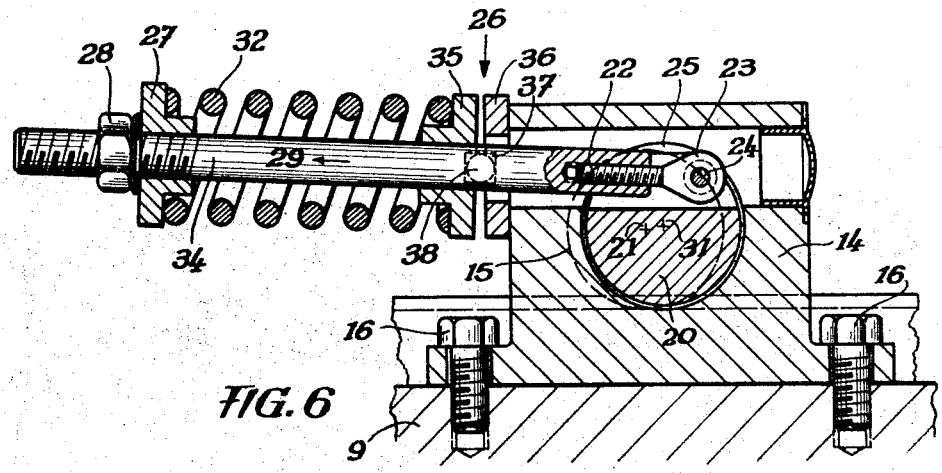
FIG. 6 represents a section transverse to the section of FIG. 4 with a spring loaded pull rod eccentrically engaging the supporting shaft while the tool carrying head occupies its starting position, i.e., a position within the region of the supporting beam support.
Figure 7:
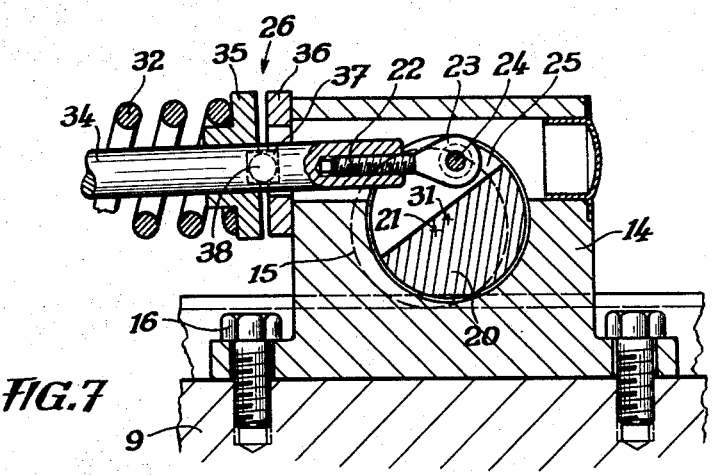
FIG. 7 illustrates a section transverse to the section of FIG. 5 similar to FIG. 6 with the tool carrying head occupying a position outside its starting position.

Referring now to the drawings in detail, the arrangement shown in FIGS. 1 and 2 concerns a one-stand vertical boring mill or vertical lathe which in customary manner comprises a base 1 with a face plate or chuck 2 which is rotatably journalled on said base 1 and adapted to be driven in standard manner. The device of FIGS. 1 and 2 furthermore comprises a stand 3 with the two vertical columns 4 and 5 for the transverse beam 6 which latter is adapted to be moved upwardly and downwardly. The transverse beam 6 is adapted in customary manner by threaded spindles 8 and nuts 7 to be moved into respectively desired working or height position and at the desired height is arrested by any suitable means likewise in customary manner. Longitudinally guided on and along the transverse beam 6 is the tool carrying head 9 the advance of which is effected by means of a feed spindle or feed screw 10 which is adapted to be driven by the feed motor 11. The tool carrying head 9 is equipped with the vertically displaceable turret carriage 12 having the turret 13 arranged at the lower end thereof. Mounted on the tool carrying head 9 on the rearward side thereof are two bearing supports 14 for journalling the supporting shafts with the traveling rollers 15 my means of which the tool carrying head 9 is adapted to rest and roll on and along the supporting beam 17. The details concerning the traveling rollers 15 will be described in connection with the description of FIGS. 4–7.

The supporting beam 17 rests within the region of the support of transverse beam 6, i.e., within the region of the threaded spindles 8 on stand 3 and of the nuts 7 on the transverse beam 6 by means of the support 18. The supporting beam 17 serves alone to absorb the load of the tool carrying head 9 and to relieve the transverse beam 6 in such a way that it will merely serve for the precise guiding of the tool carrying head 9.

To this end, the transverse beam 6 was during its machining, namely during the machining of its guiding paths 19, placed at the points of the supports 18 so that later when suspended on the stand 3 without the tool carrying head 9 it will occupy the same position. The guiding paths 19 of the transverse beam 6 will thus be located precisely parallel to the plane of the face plate or chuck.

When the tool carrying head 9 moves from its FIG. 1 position toward the center of the face plate or chuck, in other words, carries out a movement out of the region of one of the supports 18 or one of the threaded spindles 8, the weight of the tool carrying head 9 will bring about a bending of the supporting beams 17. This bending would normally during the lowering of the tool carrying head bring about a corresponding load on the transverse beam 6 inasmuch as the latter with its guiding paths 19 would have to absorb a part of the load of the tool carrying head 9.

In order to avoid such load from acting upon the transverse beam 6, according to the present invention, with reference to the lever system and the mounting of the traveling rollers 15, steps have been taken by which the weight of the tool carrying head 9 will be compensated in conformity with the bending of the supporting beam 17 while the traveling rollers 15 remain now as before in engagement with the supporting beam 17. This will be realized by the fact that the tool carrying head 9, as shown in FIGS. 4-7, is suspended on supporting shafts 20, which are pivotable independently of each other while the traveling rollers 15 are eccentrically journalled relative to the axis of rotation or pivot center of shafts 20, said rollers 15 supporting the shafts 20 on supporting beam 17. Furthermore, by an automatic pivoting of the supporting shafts 20 in conformity with the bending of the supporting beams 17, a spring force acts for purposes of a weight compensation through a lever system onto the contact areas of the traveling rollers 15. The suspension of the tool support 9 onto the supporting shafts 20 is effected by rotatably or pivotally journalling the supporting shafts 20 in bearing supports 14 by means of anti-friction bearings 33.

FIGS. 3-7 clearly indicate how the bearing supports 14 are respectively by screws 16 mounted on the tool carrying head 9 and are fixedly connected thereto. As will be seen from FIGS. 4 and 6, when occupying their starting position, the pivot or centers of rotation 31 of the supporting shafts 20 and eccentrically the axes of rotation 21 of rollers 15 are located almost at the same level or height. Between the two anti-friction bearings 33, the supporting shafts 20 are provided with widened portions having slots 25 through which extend in transverse direction the paths 24 engaged by pull pivots 22 which by means of bearing eyes 23 embrace the pins 24.

When the tool carrying head 9 moves from its starting position of FIG. 1 in the direction toward the center of the face plate or chuck, the supporting beam 17 is subjected to bending. The traveling rollers 15 resting on the running surface 30 of beam 17 follow the said bending. In addition to the weight of the tool carrying head 9, also springs 32 act upon the traveling rollers 15 and, more specifically, through a lever system which is determined by the eccentricities or distances between the axis of rotation of the rollers 21 and the center of rotation 31 of the supporting shaft on one hand and the center of rotation 31 of the supporting shaft on the point of attack 24 of the spring on the shaft 20 on the other hand. The location of the points of attack 24 and of the axis of rotation 21 of the rollers always varies in conformity with the bending of the suporting beam. By fixing the eccentricities and the distances between the levers of the lever system as well as the associated spring forces on the contact areas of the traveling rollers with the supporting beam, the necessary relieving forces for the guiding beam of the transverse beam will be realized. In this way, it will be assured that in any position of the tool carrying head 9, the guiding paths 19 of the transverse beam 6 will be relieved.

The pulling forces acting eccentrically on the supporting shafts 20 by means of the pull pivot 22 are generated by the pressure springs 32. To this end, the pull pivots 22 are extended by the pull rods 34 which extend from the bearing supports 14. At their free ends, the counter bearings 27 are fixed by means of nuts 22. One end of the pressure springs 32 rests against the counter bearings 27, whereas the other end of said pressure springs 32 rests against the second counter bearing 26 placed upon the pull rod 34 so that the pressure spring 32 exerts a pull force acting in the direction of the arrow 29. The bearings 26 comprise annular bodies 25 and 26 between which there are provided rectangular recesses 37 outside the bores or passages for the pull rods 34. Located in said recesses 37 are coaxially arranged supporting rollers 38 so that the rings 35 of the bearings 26 are adapted to carry out pivot movements relative to the rings 38 as will be evident from a comparison of FIGS. 6 and 7. These pivot movements are necessary in order to permit the directions of the pull rods 34 to change in conformity with the changes of the position of the points of attack of the pull pivots 22 on the pins 24 of supporting shafts 20 when the latter turns.

The force or spring characteristic of each spring 32 is so designed that it will be able to while taking into consideration the lever arm determined by the eccentricity of the point of attack of the force to absorb a partial load of the tool carrying head 9 suspended on the shaft 20 and to bring about the respective necessary rotation of the supporting shaft 20 for compensating for the bending of the supporting beam 17.

FIG. 8 diagrammatically illustrates the axis of rotation of the pull rods and traveling rollers with regard to the center of rotation 31 of the supporting shafts. The eccentricity of the axis of rotation 21 of the traveling rollers is designated with $r$, and the distance of the point of attack 24 of pull rod 34, 22 from the center of rotation 31 of the supporting shaft is designated with the letter $R$.

When the tool carrying head 9 is located within the range of one of the supports 18 of supporting beam 17 or of the threaded spindle 8 of the transverse beam 6, the bend $f$ (FIG. 1) of the supporting beam 17 equals zero. A maximum bend $f$ max. (FIG. 1) is obtained when the tool carrying head 9 is halfway between the two supports 18. In conformity with the bending of the supporting beam 17, the eccentric journalling of the traveling rollers 15 brings about a change in the height difference between the axis of rotation 31 of the supporting shaft and the center of rotation 21 of the roller inasmuch as the supporting shaft 20 is supported under the influence of spring 32. As will be seen from FIG. 8, during the displacement of the tool carrying head 9, the point of attack 24 of the pull rod 34 will pass on shaft 20 the points from $M_1$ to $M_5$, whereas the center 21 of the traveling rollers will with increasing bending of the supporting beam 17 pass from point $m_1$ over the points $m_2$, $m_3$ and $m_4$ to $m_5$.

If, for purposes of simplification, it is assumed that the tool carrying head is suspended only on one single traveling roller 15, and if it is further assumed that the weight of the tool carrying head is Q, it will be appreciated that in order in each displacement position of the tool carrying head 9 to assure a complete relief of the transverse beam guiding paths, it is necessary that in each displacement position of the tool, there acts upon said single roller 15 a force $K$ which must be equal to $Q$. This equation $K = Q$ is assured under consideration of the respectively effective lever spacings $l_1$ to $l_5$ (spacing between axis of rotation 21 of the traveling roller and center of rotation 31 of the supporting shaft) on one hand and $L_1$ to $L_5$ (spacing between the center of rotation 31 of supporting shaft and point of attack 24) on the other hand and the characteristic of the spring 32. In the individual displacement positions of the tool carrying head 9, the following necessary spring forces are thus obtained:

$P_1 = K \times l_1/L_1$; $P_2 = K \times l_2/L_2$; $P_3 = K \times l_3/L_3$; $P_4 = K \times l_4/L_4$; $P_5 = K \times l_5/L_5$ In this connection, the spring force of the preloaded pressure spring 32 changes by relaxing the spring from $F_1$ via $F_2$, $F_3$, $F_4$ to $F_5$. In view of the thrust of spring 32, the position of the traveling roller 15 will adapt itself automatically to the bend of the beam 17. In this way, due to the eccentricity of the journalling of the traveling rollers with regard to the center of rotation of the supporting shaft, the distances $l_1$, $l_2$, $l_3$, $l_4$ and $l_5$ adapt themselves to the magnitude of the bend. The spring force characteristic of spring 32 is so selected that the weight of the tool carrying head 9 as well as the occurring moments are taken into consideration. This means that in all positions of the tool support 9, the same pressing pressure $K$ prevails between the traveling roller 15 and the beam 17. Thus the transverse beam 6 will in all positions remain relieved from the weight of the tool carrying head 9.

Inasmuch as the position of the rollers 15 always depends on the bending of the supporting beam 17, also with the arrangement of two tool carrying heads 9 on the transverse beam 6, the weight compensating device according to the present invention will remain effective. In this instance, always the transverse beam guiding paths 19 are relieved and are parallel to the plane of the face plate or chuck 2.

Similar conditions as they are prevailing with a machine tool in which the transverse beam is supported on both sides are substantially obtained for weight compensating device in conformity with the arrangement of FIGS. 10 and 11 according to which the transverse beam 6a is adjustable only within the region of one end by means of spindle 8a and nut 7a along the stand 3a and in vertical direction, whereas the other transverse beam end freely protrudes in the manner of a cantilever. With a transverse beam 6a which unilaterally freely projects in the manner of a cantilever, the transverse cross section of the transverse beam is, over a portion of the length of the transverse beam, so designed that a bending of the transverse beam will also not occur when the tool carrying head 9a is located outwise the supporting point of the transverse beam on the stand 3a. This can apply, however, only for a portion of the transverse beam length namely, up to approximately the center of the transverse beam. With the arrangement according to the invention, within the area up to which due to the dimensioning of the beam, a bending of the beam under the weight of the tool carrying head does not occur, there is provided a support 18a for the supporting beam 17a which is carried by the transverse beam 6a. Beam 17a is within the region of its rear end which faces toward the stand 3a also fixed in the pivot point 18b on the transverse beam 6a. The supporting beam 17a may on one hand under the weight of the tool carrying head 9a bend between its supporting points 18a and 18b and on the other hand from the supporting point 18a to its free end which faces away from the stand 3a, while the maximum bend within the region of the free end amounts to $f_{max}$. The weight compensating device according to the invention for a machine tool with freely projecting transverse beam otherwise corresponds to the weight compensating device as it has been described in connection with FIGS. 1 to 3 so that a further description of the weight compensating device with freely projecting transverse beam is not necessary. The arrangement according to the present invention also will, with a machine according to FIGS. 10 and 11, assure that during a displacement of the tool carrying head 9a by means of the feed motor 11a, the transverse beam guiding paths 19a remain relieved because the bending of the supporting beam 17a is compensated by the weight compensating device in the same manner as it has been described in connection with FIGS. 1–9.

It is, of course, to be understood that the present invention is, by no means, limited to the particular showing in the drawings but also comprises any modifications within the scope of the appended claims.

What is claimed is:

1. In a machine tool; a frame, a transverse beam supported in said frame at two points spaced longitudinally along said beam, longitudinal guide surfaces on said beam, a tool head moveable along said beam and engaging said guide surfaces and guided thereby, a support beam having a support surface parallel to said guide surfaces on said transverse beam, and said support beam being supported on said transverse beam in the region of said points, longitudinally spaced rollers on said tool head engaging said support surface of said support beam to support the tool head on the support beam, a shaft rotatably supporting each roller, each shaft being rotatably connected to said tool head for rotation thereon on an axis radially offset from the axis of rotation of the respective roller, a spring operatively bearing between said tool head and a point on each said shaft which is radially offset from the axis of rotation of said shaft, means supporting each spring to bias the respective roller toward said support surface of said support beam whereby each roller will follow deflecting movements of said beam and remain in load transmitting relation therewith and thereby prevent deflection of said transverse beam due to any load imposed thereon by said tool head.

2. A machine tool according to claim 1 in which said means supporting each spring includes a pull rod connected to each shaft at said point and projecting outwardly from said tool head, a respective spring surrounding each pull rod and at one end engaging first abutment means on said tool head, and second abutment means on said rod engaging the other end of said spring.

3. A machine tool according to claim 2 in which said second abutment means is threaded on the respective rod so as to be adjustable therealong.

4. A machine tool according to claim 2 in which said first abutment means comprises a plate slidable on the respective rod, and a bearing between said plate and said tool head to permit said rod to tilt as said shaft rotates.

5. A machine tool according to claim 1 in which the location of said point and the amount of radial offset of the axis of the shaft from the axis of the roller and the modulus of said spring are selected to maintain the respective roller in substantially complete load transmitting engagement with said support surface of said support beam in all deflected positions of said support beam.

* * * * *